United States Patent
Yoo et al.

(10) Patent No.: US 9,508,152 B2
(45) Date of Patent: Nov. 29, 2016

(54) OBJECT LEARNING AND RECOGNITION METHOD AND SYSTEM

(71) Applicant: SAMSUNG ELECTRONICS CO., LTD., Suwon-si, Gyeonggi-do (KR)

(72) Inventors: Byung In Yoo, Seoul (KR); Chang Kyu Choi, Seongnam-si (KR); Chang Kyo Lee, Yongin-si (KR); Jae Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 14/345,563

(22) PCT Filed: Jan. 9, 2013

(86) PCT No.: PCT/KR2013/000174
§ 371 (c)(1),
(2) Date: Mar. 18, 2014

(87) PCT Pub. No.: WO2013/105783
PCT Pub. Date: Jul. 18, 2013

(65) Prior Publication Data
US 2015/0023557 A1    Jan. 22, 2015

(30) Foreign Application Priority Data

Jan. 11, 2012 (KR) .......... 10-2012-0003585
Jan. 19, 2012 (KR) .......... 10-2012-0006181
Sep. 25, 2012 (KR) .......... 10-2012-0106183

(51) Int. Cl.
*G06K 9/00* (2006.01)
*G06T 7/00* (2006.01)
(Continued)

(52) U.S. Cl.
CPC ......... *G06T 7/0046* (2013.01); *G06K 9/00201* (2013.01); *G06K 9/00335* (2013.01);
(Continued)

(58) Field of Classification Search
CPC ............ G06K 9/00201; G06K 9/00335; G06K 9/00362; G06K 9/6212; G06K 9/626; G06K 9/6282; G06T 2200/24; G06T 2207/10028; G06T 2207/20081; G06T 2207/30196; G06T 7/0046
See application file for complete search history.

(56) References Cited

U.S. PATENT DOCUMENTS

2005/0147303 A1    7/2005   Zhou et al.
2007/0053563 A1    3/2007   Tu et al.
(Continued)

FOREIGN PATENT DOCUMENTS

CN    101989326 A    3/2011
CN    102016877 A    4/2011
(Continued)

OTHER PUBLICATIONS

Vincent Jantet et al., "Object-based Layered Depth Images for Improved Virtual View Synthesis in Rate-Constrained Context", 2011 18th IEEE International Conference on Image Processing, Sep. 11-14, 2011, pp. 125-128.
(Continued)

*Primary Examiner* — Siamak Harandi
(74) *Attorney, Agent, or Firm* — NSIP Law

(57) ABSTRACT

An object recognition system is provided. The object recognition system for recognizing an object may include an input unit to receive, as an input, a depth image representing an object to be analyzed, and a processing unit to recognize a visible object part and a hidden object part of the object, from the depth image, by using a classification tree. The object recognition system may include a classification tree learning apparatus to generate the classification tree.

20 Claims, 19 Drawing Sheets

(51) Int. Cl.
*G06K 9/62* (2006.01)
*G06K 9/46* (2006.01)

(52) U.S. Cl.
CPC ........... *G06K9/00362* (2013.01); *G06K 9/624* (2013.01); *G06K 9/626* (2013.01); *G06K 9/6212* (2013.01); *G06K 9/6282* (2013.01); *G06K 9/469* (2013.01); *G06T 2200/24* (2013.01); *G06T 2207/10028* (2013.01); *G06T 2207/20048* (2013.01); *G06T 2207/20081* (2013.01); *G06T 2207/30196* (2013.01)

(56) References Cited

U.S. PATENT DOCUMENTS

| | | | |
|---|---|---|---|
| 2009/0252423 | A1 | 10/2009 | Zhu et al. |
| 2010/0303302 | A1* | 12/2010 | Kipman ............. G06K 9/00369 382/107 |
| 2011/0072397 | A1 | 3/2011 | Baker et al. |

FOREIGN PATENT DOCUMENTS

| | | |
|---|---|---|
| JP | 2005-165791 | 6/2005 |
| JP | 2007-226655 | 9/2007 |
| JP | 2009-15827 | 1/2009 |
| JP | 2009-146405 | 7/2009 |
| JP | 2009-211525 | 9/2009 |
| JP | 2010-244549 | 10/2010 |
| JP | 2011-59898 | 3/2011 |
| JP | 2011-123071 | 6/2011 |
| JP | 2011-238222 | 11/2011 |
| JP | 2011-243194 | 12/2011 |
| KR | 2000-0068660 | 11/2000 |
| KR | 10-2009-0093119 | 9/2009 |
| KR | 10-2010-0113382 | 10/2010 |
| KR | 10-2011-0053288 | 5/2011 |
| KR | 10-2011-0069923 | 6/2011 |
| KR | 10-1068465 | 9/2011 |
| KR | 10-1077788 | 10/2011 |
| KR | 10-2011-0133677 | 12/2011 |

OTHER PUBLICATIONS

Bruce F. Naylor, "Partitioning Tree Image Representation and Generation from 3D Geometric Models", Proceedings of the conference on Graphics interface, 1992, pp. 1-12.
Jamie Shotton et al., "Real-Time Human Pose Recognition in Parts from Single Depth Images", 2011 IEEE Conference on Computer Vision and Pattern Recognition, Jun. 20-25, 2011, pp. 1-8.
International Search Report mailed May 7, 2013 in related International Application No. PCT/KR2013/000174.
Chaohui Wang et al., "Segmentation, Ordering and Multi-Object Tracking Using Graphical Models", ICCV. 2009, pp. 747-754, XP031672577.
Varun Ganapathi et al., "Real Time Motion Capture using a Single Time-of-Flight Camera", Computer Vision and Pattern Recognition (CVPR), 2010 IEEE Conference on. IEEE, 2010, pp. 755-762, XP031725966.
James Charles et al., "Learning Shape Models for Monocular Human Pose Estimation from the Microsoft Xbox Kinect", Computer Vision Workshops (ICCV Workshops), 2011 IEEE International Conference on. IEEE, 2011, pp. 1202-1208, XP032095384.
Nam-Gyu Cho et al., "Nonflat Observation Model and Adaptive Depth Order Estimation for 3D Human Pose Tracking", Pattern Recognition (ACPR), 2011 First Asian Conference on. IEEE, 2011, pp. 382-386, XP032130016.
Ross Girshick et al., "Efficient Regression of General-Activity Human Poses from Depth Images", Computer Vision (ICCV), 2011 IEEE International Conference on. IEEE, 2011, pp. 415-422, XP055237685.
Extended European search report issued on Feb. 18, 2016 in counterpart European Patent Application No. 13735721.6.
Chinese Office Action issued on Mar. 31, 2016 in counterpart Chinese Patent Application No. 201380003629.5 (16 pages in English; 9 pages in Chinese).

\* cited by examiner

Visible object parts 501 → Hidden object parts 502

Visible object parts 601     Hidden object parts 602

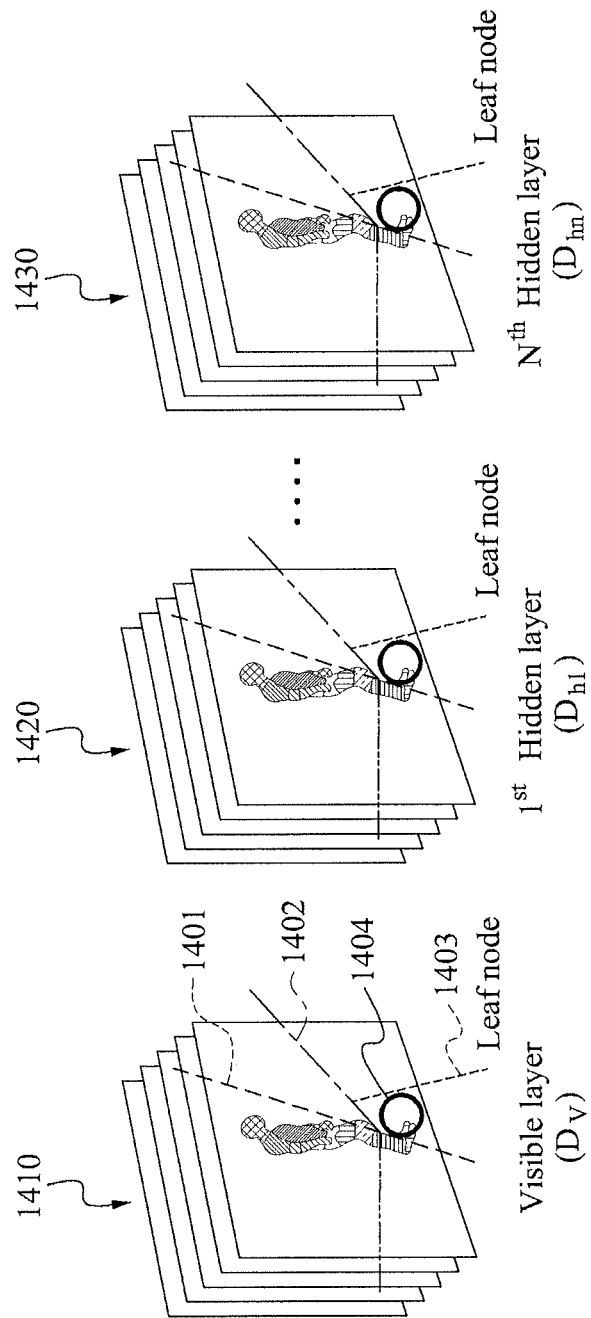

OBJECT LEARNING AND RECOGNITION METHOD AND SYSTEM

CROSS-REFERENCE TO RELATED APPLICATIONS

This application is a U.S. national stage application of PCT/KR2013/000174 filed Jan. 9, 2013 and claims the priority benefit of Korean Patent Application 10-2012-0003585 filed Jan. 11, 2012, Korean Patent Application 10-2012-0006181 filed Jan. 19, 2012, and Korean Patent Application No. 10-2012-0106183 filed Sep. 25, 2012, in the Korean Intellectual Property Office, the contents of all of which are incorporated herein by reference.

BACKGROUND

1. Technical Field

Example embodiments of the following description relate to an object learning and/or recognition method and system, and more particularly, to an object learning and/or recognition method and system that may recognize an object based on a learned classification tree and a single depth image.

2. Background Art

A technology of sensing body movements and controlling a user interface (UI) is likely to be actively used to control interactive video, as well as, used as an input unit of current graphic-based games.

SUMMARY

The foregoing and/or other aspects are achieved by providing an object recognition system including an input unit configured to receive, as an input, a depth image representing an object to be analyzed, and a processing unit configured to recognize a visible object part and a hidden object part of the object, from the depth image, using a classification tree.

The foregoing and/or other aspects are achieved by providing a classification tree learning apparatus generating a classification tree being configured for use in recognizing a visible object part and a hidden object part of an object to be analyzed. The classification tree learning apparatus may include a learning unit configured to generate the classification tree, based on training data associated with the object.

The foregoing and/or other aspects are achieved by providing an object recognition method, including receiving, as an input, a depth image representing an object to be analyzed, and recognizing a visible object part and a hidden object part of the object, from the depth image, using a classification tree.

The foregoing and/or other aspects are achieved by providing a classification tree learning method for generating a classification tree, the classification tree being configured for use by an object recognition system to recognize a visible object part and a hidden object part of an object to be analyzed from a depth image. The method may include generating the classification tree, based on training data associated with the object.

BRIEF DESCRIPTION OF THE DRAWINGS

The following description of one or more example embodiments should be considered in conjunction with the accompanying drawings of which:

FIG. 14B illustrates an object recognition method, represented herein as being implemented by an example object recognition system, determining a leaf node, according to example embodiments.

DETAILED DESCRIPTION

Figure 1:
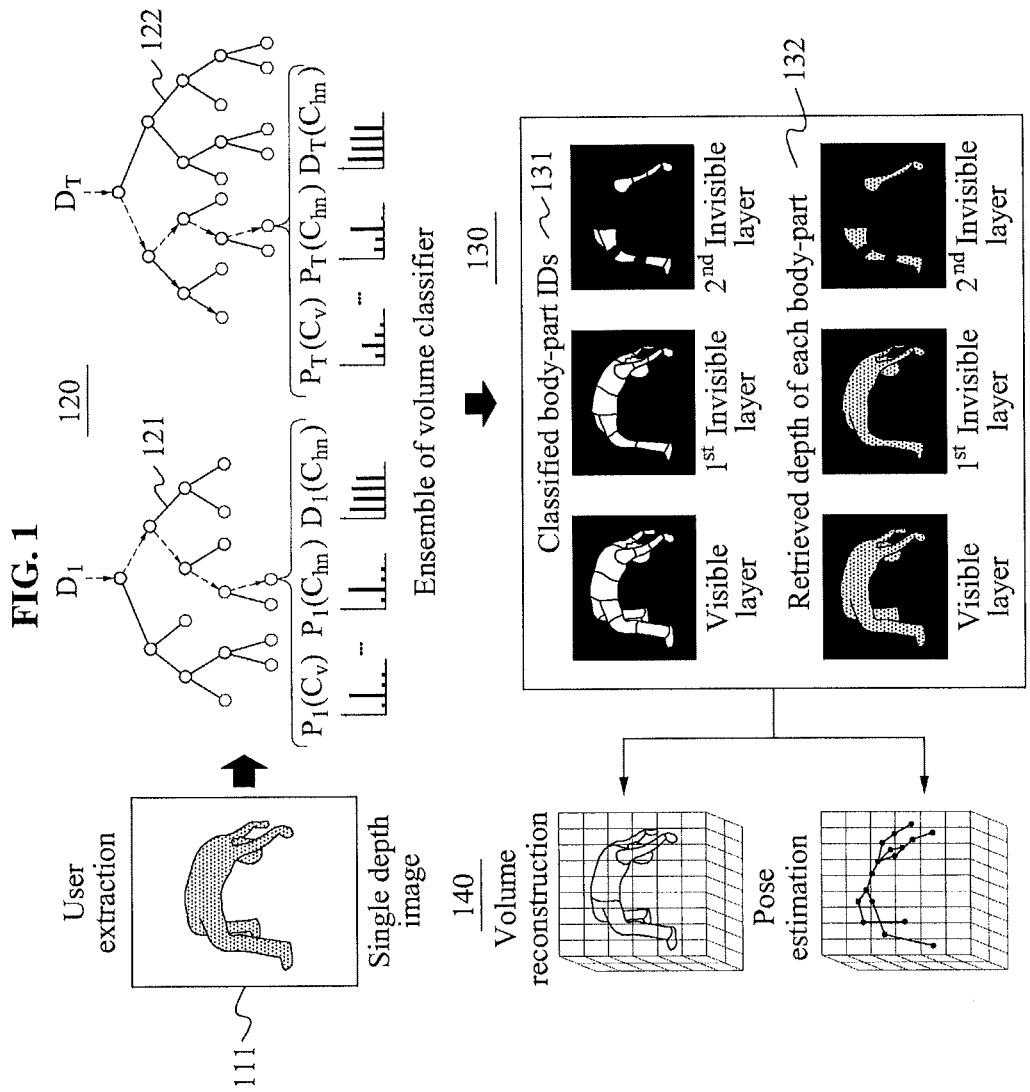
FIG. 1 illustrates an object recognition method, performed by an object recognition system, according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures.

FIG. 1 illustrates aspects of an recognition method, performed by an object recognition system, according to example embodiments. Referring to FIG. 1, the object recognition system may recognize both a visible part of an object to be analyzed and a hidden part of the object, using a single depth image 111 of the object, and may construct a volume of the object based on a result obtained by analyzing the object. Specifically, the object recognition system may recognize a plurality of components of the object, using a single depth image of the object, instead of using a plurality of depth images. For example, when the object is a human, body parts of the human may represent such components, for example hands, arms, legs, a trunk, and the like, may represent a plurality of components of the object. Various objects, for example a human, an animal, an inanimate object, and the like, may be analyzed.

The object recognition system may include a classification tree learning apparatus, and an object recognition apparatus, both discussed in greater detail below. Accordingly, the recognition method of FIG. 1 may also represent both a classification tree learning process and object recognition process. The classification tree learning apparatus may learn classification trees 121 and 122, and the object recognition apparatus may use the learned classification trees 121 and 122. In operation 120, the object recognition apparatus may recognize a visible object part and a hidden object part of the object from the single depth image 111, using the classification trees 121 and 122 that are generated and learned by the classification tree learning apparatus. In this instance, depending on example embodiments, the object recognition system may generate and learn the classification trees 121 and 122, and may recognize a visible object part and a hidden object part of the object. A plurality of classification trees may be used as shown in FIG. 1, or only a single classification tree may be used, as needed. The visible object part may refer to a part of an image representing the object that is directly viewed, and the hidden object part may refer to a part of the image that is not directly viewed based on an angle of the image, a capturing direction, interior depth of the object, and the like.

Depending on example embodiments, the object recognition apparatus may retrieve a visible layer of the object, and one or more hidden layers of the object, using the learned classification trees 121 and 122 in operation 130. In operation 131, the object recognition apparatus may classify identifiers (IDs) of directly visible parts of a depth image that are visible parts of the depth image, and IDs of directly invisible parts of the depth image that are hidden parts of the depth image, from a result of recognition of visible object parts and hidden object parts. This is represented in FIG. 1 with the illustrated classified or recognized single visible layer, $1^{st}$ invisible (or hidden) layer, and $2^{nd}$ invisible (or hidden) layer. In operation 132, the object recognition apparatus may retrieve a depth value of each of the hidden parts. This is represented in FIG. 1 with the illustrated retrieved single visible layer, $1^{st}$ invisible (or hidden) layer, and $2^{nd}$ invisible (or hidden) layer. In operation 140, the object recognition apparatus may reconstruct the volume of the object or may estimate a pose of the object, based on retrieved information.

The object recognition system may be applied to all types of devices that require recognition of an object. For example, the object recognition system may be used in a smart TV including a large format display (LFD), a smartphone, a mobile device including a camera, a tablet, a notebook computer, an all-in-one personal computer (PC), a PC including a desktop, and the like.

Additionally, the object recognition system may have differing applications. For example, the object recognition system may be applied to a technical field, for example, exercise game (exergame), virtual sports, virtual entertainments, graphical animations, video object exploration, ergonomics, human-robot interactions, surveillance, natural user interfaces (UIs) for consumer electronics, and the like. For example, the object recognition system may be used as a technology for controlling interactive video in a music video market, a music broadcasting market, a health video market, and the like.

Figure 3:
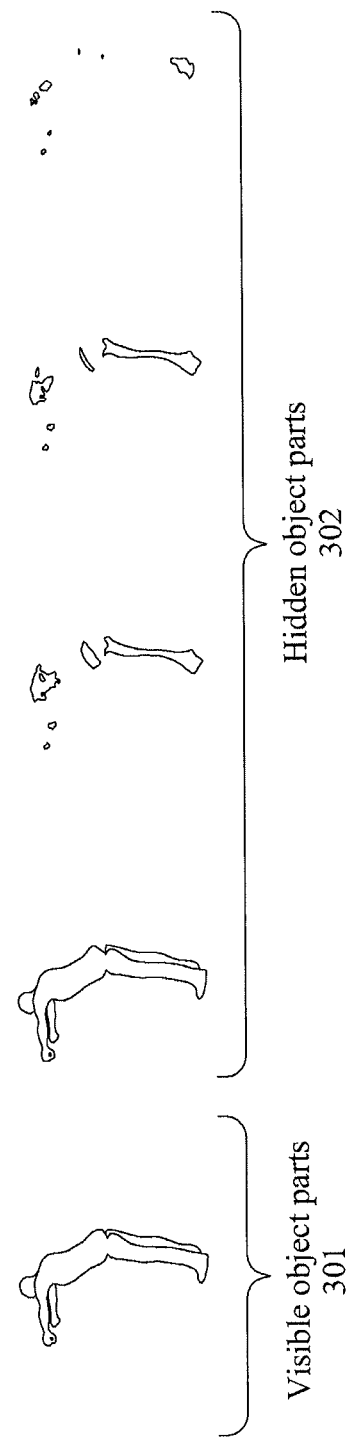
Figure 4:
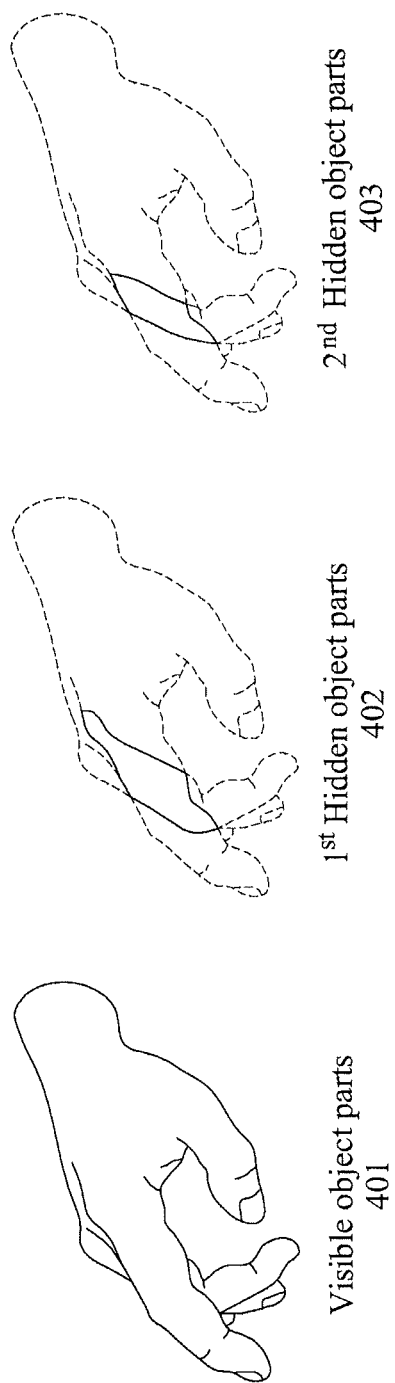
Figure 5:
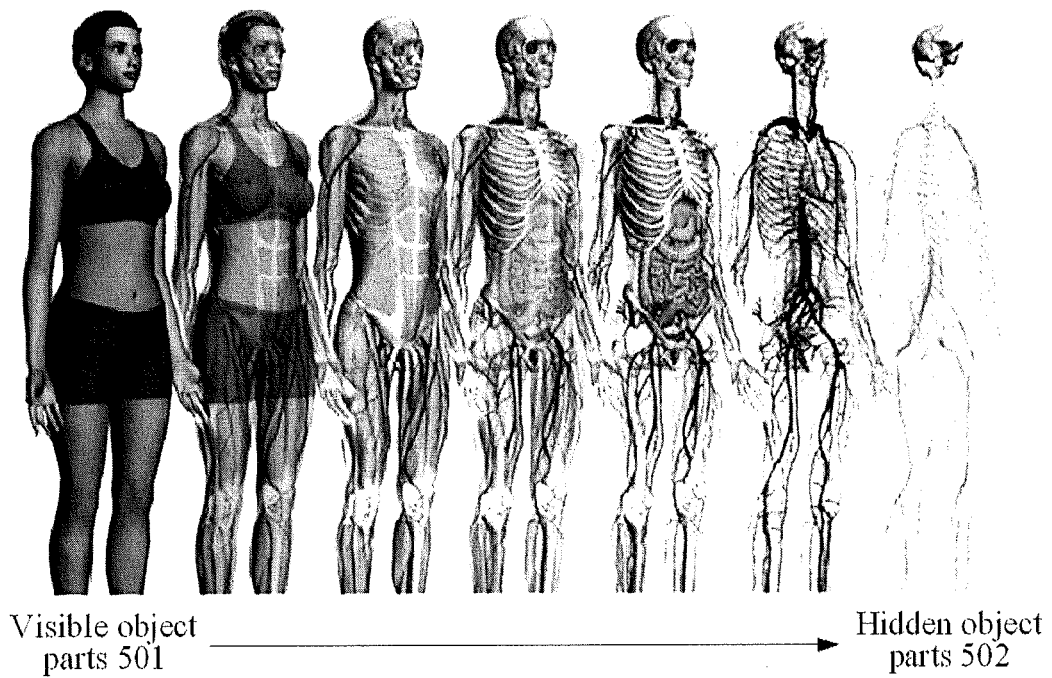
Figure 6:
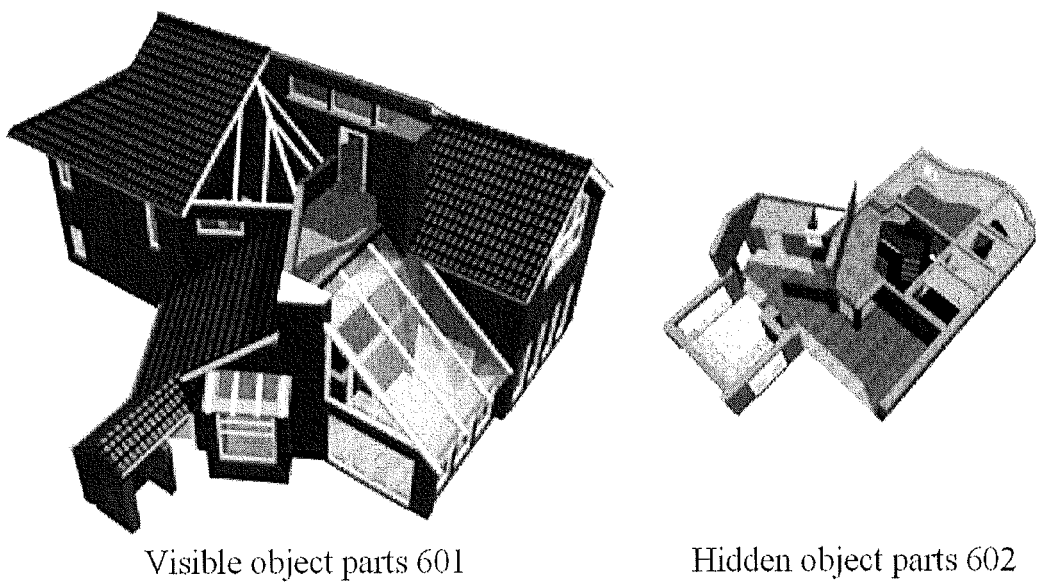

FIGS. 2 through 6 illustrate diagrams of visible object parts and hidden object parts, according to example embodiments. Visible object parts may represent parts that are directly visible with eyes from an image acquired by capturing an object (for example, a color image or a depth image), and hidden object parts may represent rear parts or inner parts of the object that are covered and hidden by the other parts. For example, when an object is captured by an image sensor, a part of the object bearing an image on a sensor plane of the image sensor 201 may be defined to be visible object part data, and a part of the object in which a self-occlusion of the object, or an occlusion caused by another object occurs, may be defined to be hidden object part data. Hidden object part data may also be representative of parts of the objects at depths between a visible outer layer and a rear outer layer, such as muscular levels, vascular levels, or skeletal levels, for example, as shown in FIG. 5.

Figure 2:
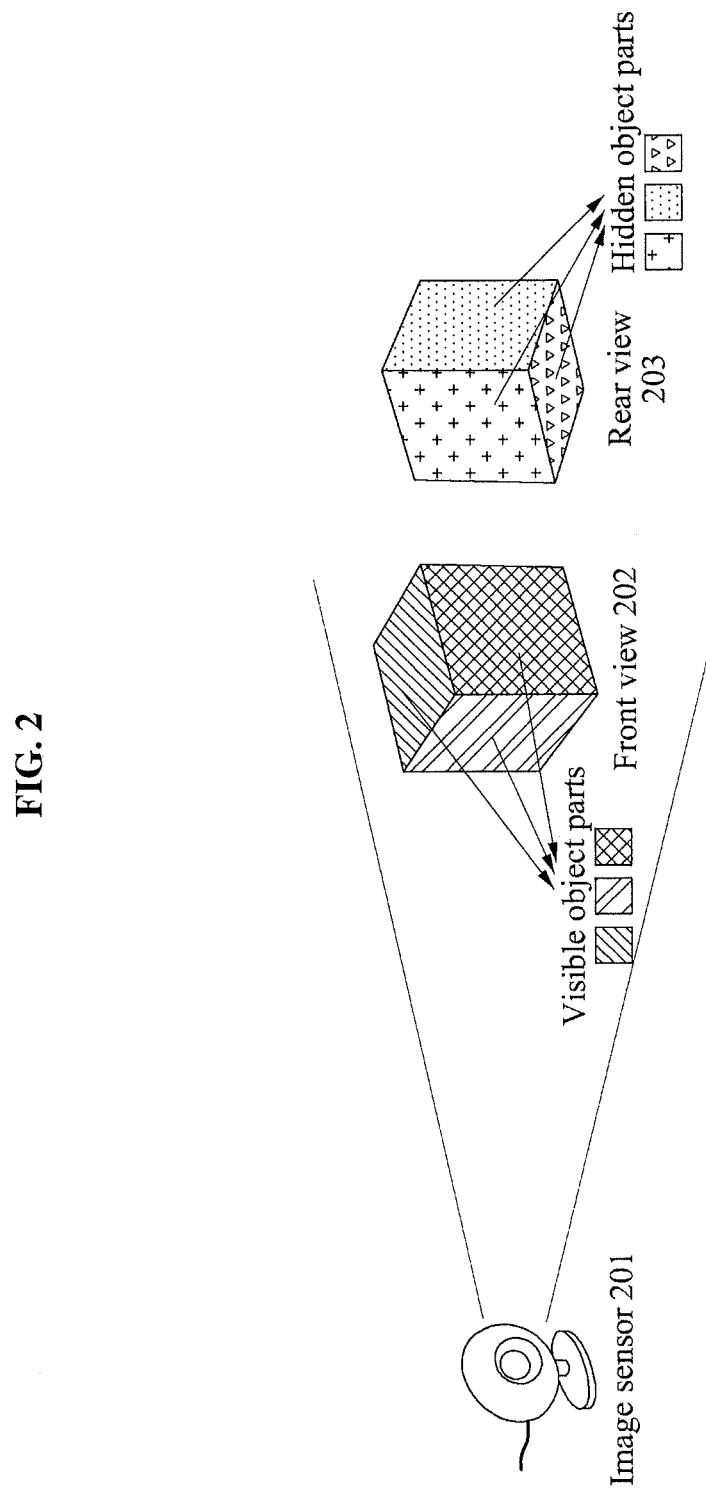
FIGS. 2 through 6 illustrate diagrams of visible object parts and hidden object parts, according to example embodiments.

Referring to FIG. 2, when an object is a regular hexahedron, three faces of a front view 202 of the regular hexahedron may be defined to be three visible object parts, shown as being observed by image sensor 201, and three faces of a rear view 203 of the regular hexahedron may be defined to be three hidden object parts, shown as not being observed by the image sensor 201. Referring to FIG. 3, when an object is a human, and when an image is acquired by capturing a left side of the human, a part of a human body, such as a left arm, a left leg of the human body and the like, may be defined to be a visible object part 301, and a right arm, a left trunk, a right leg, and the like that are hidden by the left arm and the left leg may be defined to be hidden object parts 302. Referring to FIG. 4, when an object is a right hand of a human, and when an image is acquired by capturing a left side of the right hand, a thumb, an index finger and the like may be defined to be visible object parts 401, a part of a middle finger may be defined to be represented in the first hidden object parts 402, and a part of a ring finger may be defined to be represented in the second hidden object parts 403.

Hidden object parts of FIGS. 2 through 4 may not be directly viewed, since hidden object parts are covered by other parts in an image acquired by capturing an object, or are disposed in an opposite side to a capturing sensor. Depending on example embodiments, hidden object parts may be disposed inside the object. For example, referring to FIG. 5, when an object is a human, an appearance of the human may be defined to be visible object parts 501, and muscles, skeletons, internal organs, a cardiovascular system, a nervous system, and the like that are included in a human body may be defined to be hidden object parts 502, with differing elements being represented in different corresponding hidden layers, for example. Additionally, referring to FIG. 6, when an object is a building, a visible exterior of the building may be defined to be visible object parts 601, and an interior structure of the building may be defined to be hidden object parts 602.

Various examples of an object have been described above with reference to FIGS. 2 through 6, however, an example operation of the classification tree learning apparatus, and an example operation of the object recognition apparatus will be described in greater detail below based on a pose of a human of FIG. 3.

Figure 7A:
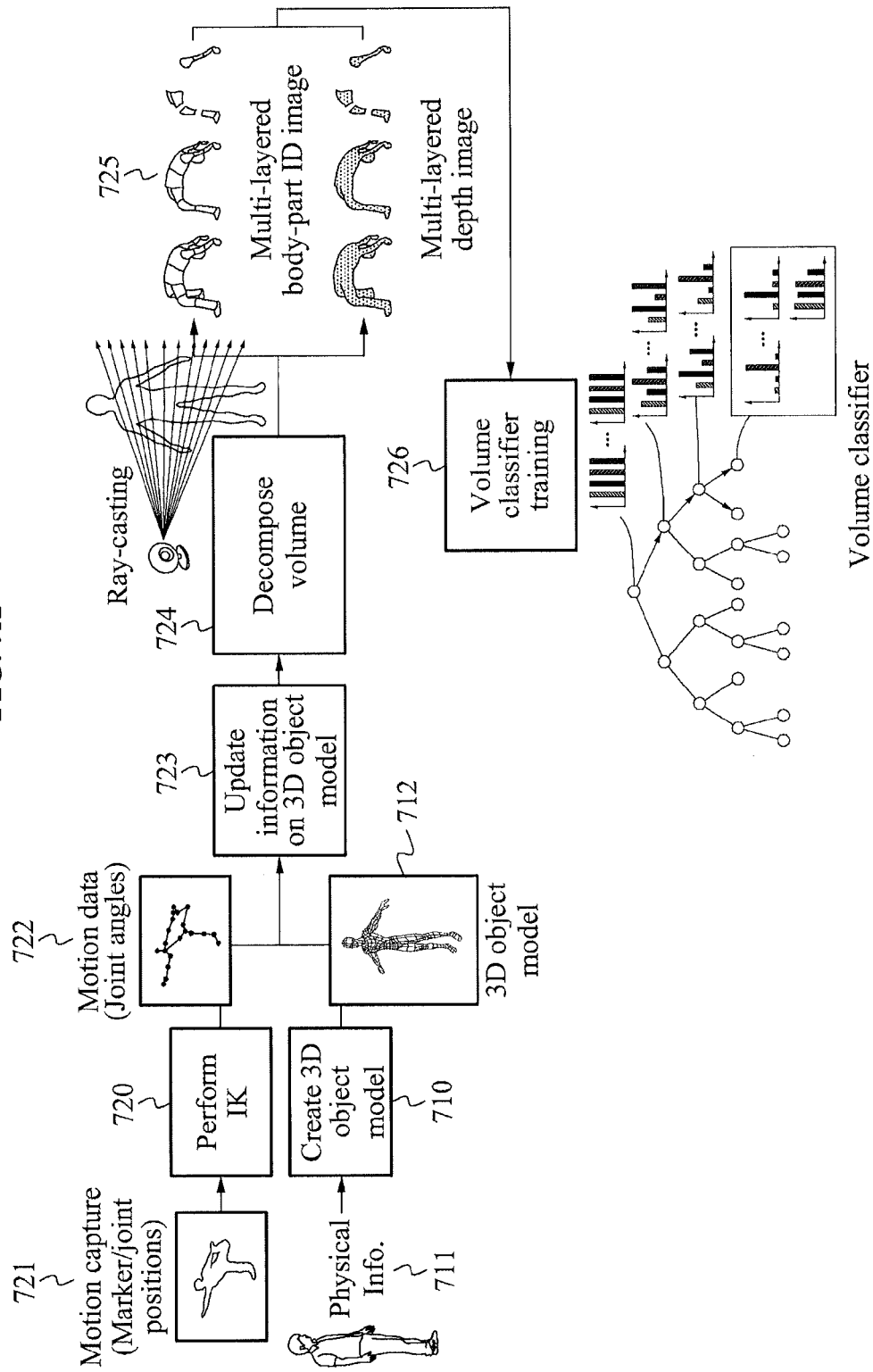
FIG. 7A illustrates a classification tree learning method, represented herein as being implemented by an example classification learning apparatus, according to example embodiments.

FIG. 7A illustrates a classification tree learning method, represented herein as being implemented by an example classification learning apparatus, according to example embodiments. The classification tree learning apparatus may generate and learn a classification tree that is then used by the object recognition apparatus to recognize a visible object part and a hidden object part of an object to be analyzed. As noted above, an example object recognition system may include both the classification tree learning apparatus and the object recognition apparatus. Depending on example embodiments, as a preprocessing operation performed when the classification tree learning apparatus learns a classification tree, a corresponding object recognition system may create a three-dimensional (3D) object model 712. In operation 710, the object recognition system may create the 3D object model 712, based on physical information 711 associated with the object. Additionally, the object recognition system may perform a motion capture of the object in operation 721, and may perform inverse kinematics (IK) on the object in operation 720, to collect motion data 722. The object recognition system may apply the collected motion data 722 to the 3D object model 712, and may update information on the 3D object model 712 in operation 723.

To generate training data used to learn a classification tree, the classification tree learning apparatus may decompose a volume, based on the updated information on the 3D object model 712 in operation 724. The classification tree learning apparatus may decompose the volume, using a ray-casting scheme. Subsequently, in operation 725, the classification tree learning apparatus may collect information on depth values and IDs associated with the object, as discussed in greater detail below. In operation 726, the classification tree learning apparatus may generate training data based on the collected information, and may learn the classification tree using the generated training data. Depending on example embodiments, the classification tree learning apparatus may use a random forest as a classification tree.

Figure 7B:
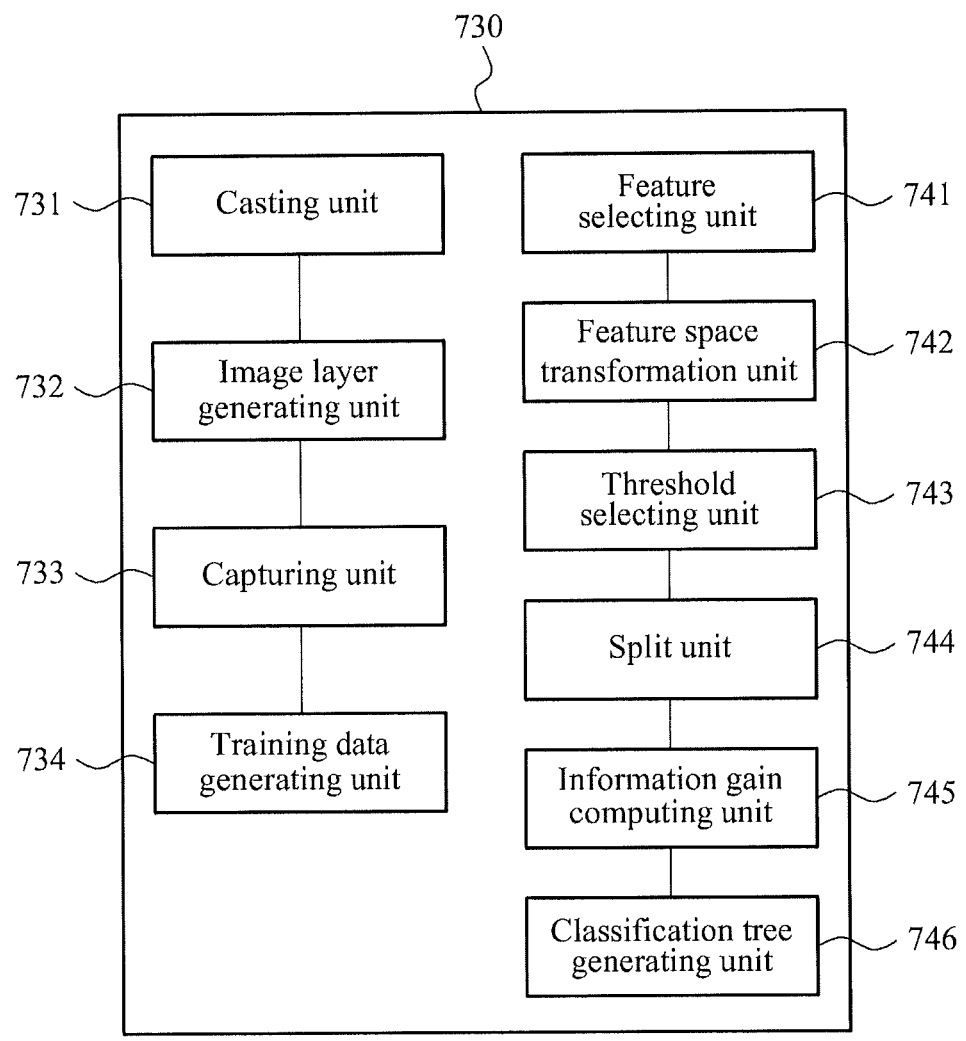
FIG. 7B illustrates a block diagram of a configuration of a learning unit of a classification tree learning apparatus, according to example embodiments.

FIG. 7B illustrates a block diagram of a configuration of a learning unit of a classification tree learning apparatus, according to example embodiments. Referring to FIG. 7B, the classification tree learning apparatus may include a learning unit 730. The learning unit 730 may generate a classification tree, using training data associated with an object to be analyzed. In other words, the learning unit 730 may learn the classification tree, using the training data. Depending on example embodiments, the learning unit 730 may directly generate training data. The learning unit 730 may include a casting unit 731, an image layer generating unit 732, a capturing unit 733, and a training data generating unit 734.

Figure 7C:
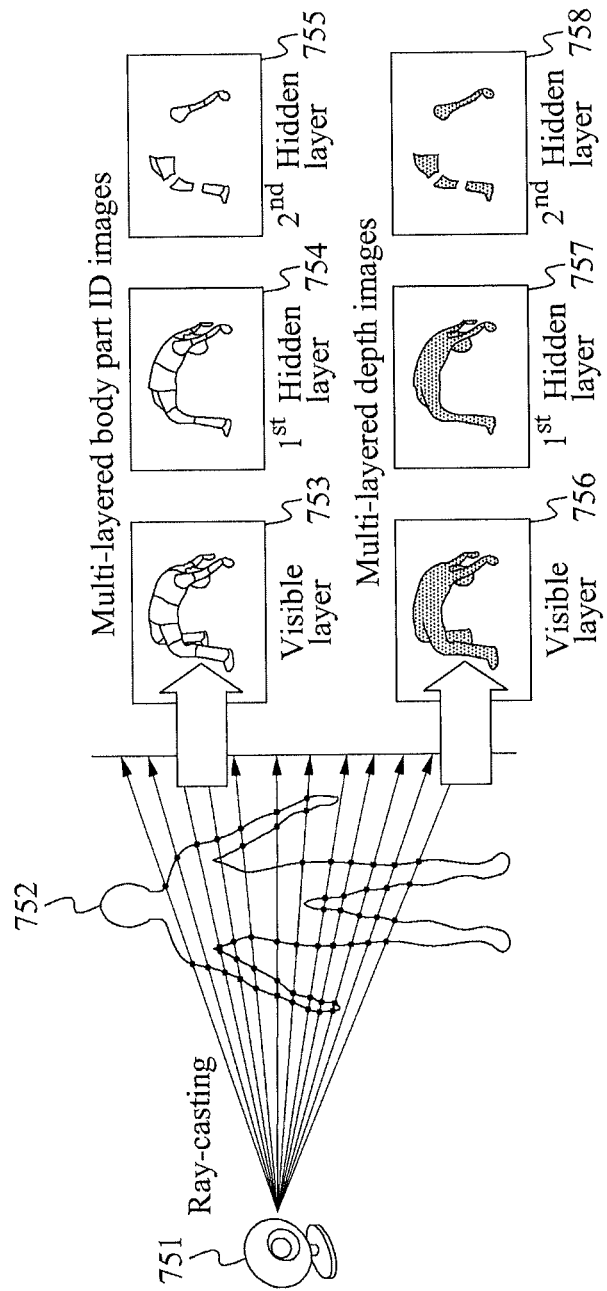
FIG. 7C illustrates a classification tree learning method, represented herein as being implemented by an example classification learning apparatus, for generating training data using a ray-casting scheme, according to example embodiments.

FIG. 7C illustrates a classification tree learning method, represented herein as being implemented by an example classification learning apparatus, for generating training data using a ray-casting scheme, according to example embodiments. Referring to FIG. 7C, the casting unit 731 may cast rays towards a plurality of voxels of a 3D object model 752 of an object to be analyzed (for example, a human), by using a virtual camera 751. The image layer generating unit 732 may generate a plurality of image layers sequentially every time rays again penetrate a surface of the 3D object model 752. For example, the image layer generating unit 732 may collect points or voxels of the 3D object model 752 through which rays initially penetrate, and may generate a visible layer. Additionally, when rays pass through the 3D object model 752 and then again penetrate the 3D object model 752, that is, when rays penetrate the 3D object model 752 twice, the image layer generating unit 732 may collect points or voxels through which the rays penetrate, and may generate a first hidden layer, representing a second penetrated part. Similarly, the image layer generating unit 732 may generate a second hidden layer, a third hidden layer, and a fourth hidden layer. Based on a shape, a pose, and the like of the object, a direction between the virtual camera 751 and the object, and the like, a single hidden layer or a plurality of hidden layers may be generated. For example, refer again to FIGS. 3-5 for demonstrations of such hidden layers. With the example of FIG. 5, the hidden layer does not have to represent a second penetration of the 3D object model, but penetration through separate surfaces or components of the 3D object model.

The capturing unit 733 may capture a depth value and a voxel ID of a surface through which rays penetrate, for each of the plurality of image layers. Additionally, the capturing unit 733 may store the captured voxel ID and the captured depth value in each of the plurality of image layers. In an example, the capturing unit 733 may capture IDs of points or voxels of the 3D object model 752 through which rays initially penetrate, may store the captured IDs in a visible layer, and may generate an ID image 753 of an object part displayed on the visible layer. In another example, the capturing unit 733 may capture depth values of the points or voxels of the 3D object model 752 through which rays initially penetrate, may store the captured depth values in a visible layer, and may generate a depth image 756 for the visible layer. For example, when rays pass through the 3D object model 752 and then again penetrate the 3D object model 752, that is, when rays penetrate the 3D object model 752 twice, the capturing unit 733 may capture IDs of pixels or voxels through which the rays penetrate, may store the captured IDs in the first hidden layer, and may generate an ID image 754 of an object part displayed on the first hidden layer. Additionally, when rays pass through the 3D object model 752 and then again penetrate the 3D object model 752, the capturing unit 733 may capture depth values of pixels or voxels through which the rays penetrate, may store the captured depth values in the first hidden layer, and may generate a depth image 757 for the first hidden layer.

Similarly, the capturing unit 733 may equally apply the above operation associated with the first hidden layer to the second hidden layer, the third hidden layer, and the fourth hidden layer. For example, the capturing unit 733 may generate an ID image 755 of an object part displayed on the second hidden layer, and a depth image 758 for the second hidden layer.

The training data generating unit 734 may set an image layer with a minimum distance from the virtual camera 751 (that is, a visible layer) to be visible object part data. The visible object part data may include an ID and a depth value. Similarly, the training data generating unit 734 may set the other image layers (that is, hidden layers) to be hidden object part data including an ID and a depth value. The training data generating unit 734 may generate training data, using the visible object part data and the hidden object part data.

As described above in FIGS. 7B and 7C, the learning unit 730 may directly generate training data used to learn the classification tree, however, embodiments herein may not be limited thereto. Accordingly, the learning unit 730 may use training data generated using a separate scheme. Hereinafter, an operation of learning a classification tree using generated training data will be described in greater detail.

Figure 7D:
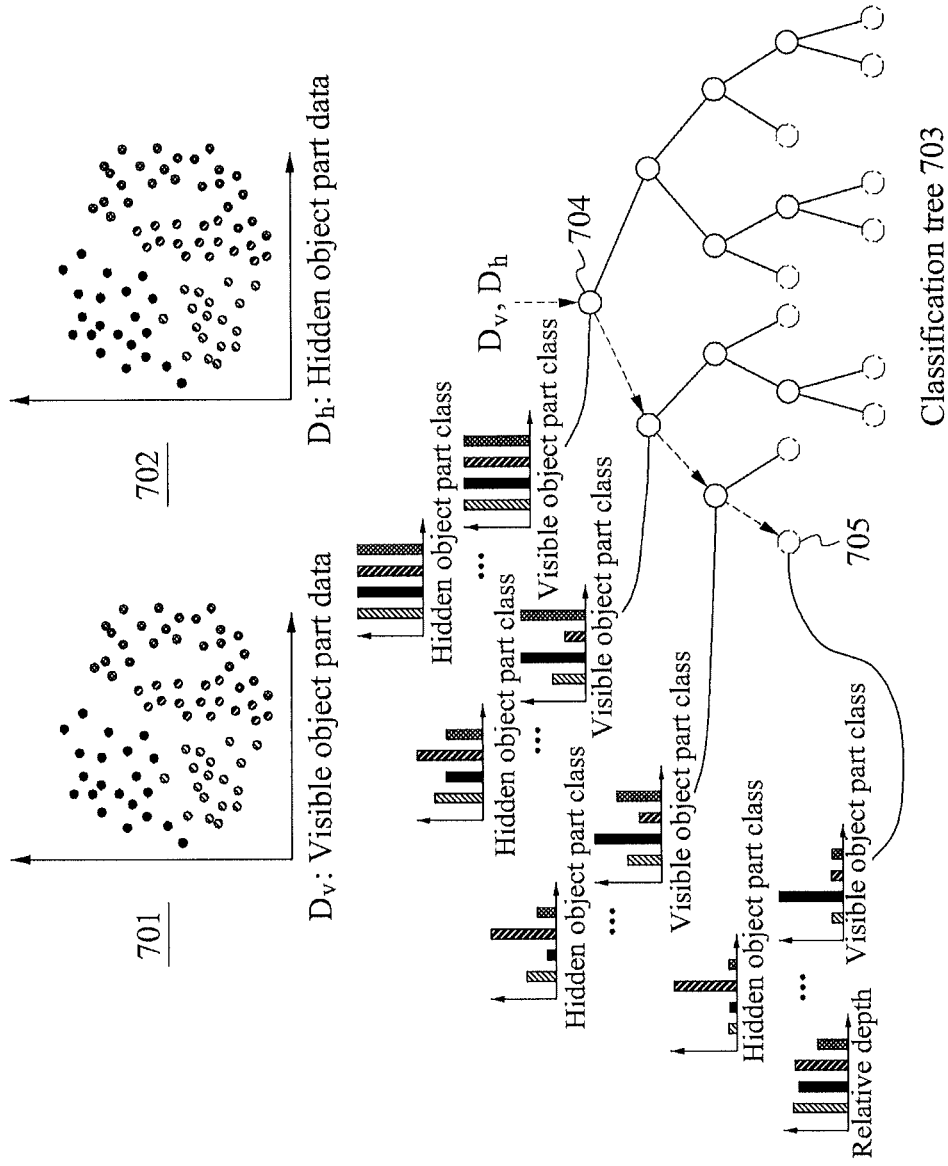
FIGS. 7D and 8 illustrate a classification tree learning method, represented herein as being implemented by an example classification learning apparatus, for learning a classification tree using training data, according to example embodiments.
Figure 8:
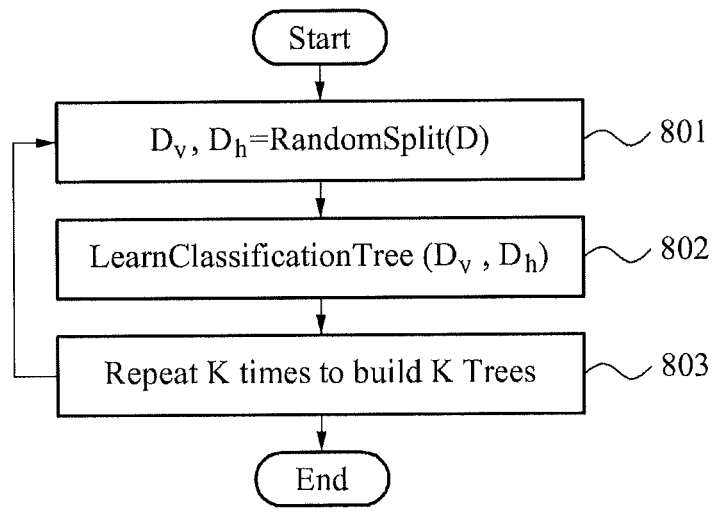

FIGS. 7D and 8 illustrate a classification tree learning method, represented herein as being implemented by an example classification learning apparatus, for learning a classification tree using training data, according to example embodiments. Referring to FIGS. 7D and 8, in operation 801, the classification tree learning apparatus may select, from training data, visible object part data $D_v$ 701 and hidden object part data $D_h$ 702 that may be used to learn a classification tree. For example, the classification tree learning apparatus may randomly select target data D to be learned. In this instance, each part of an object may form each class. For example, when an object is a human, each of the arms, legs, a trunk, a head, and the like, of the human, may be determined to represent a class.

In operation 802, the classification tree learning apparatus may input the selected visible object part data $D_v$ 701 and the selected hidden object part data $D_h$ 702, and may generate and learn a classification tree 703. For example, the classification tree learning apparatus may generate and learn a classification tree, using the selected target data D. In this instance, the target data D may include the visible object part data $D_v$ 701 and the hidden object part data $D_h$ 702.

The classification tree learning apparatus may generate histograms, and may store the histograms in each node. The histograms may each represent a probability value indicating which part of the object corresponds to input data, that is, the input visible object part data $D_v$ 701 and the input hidden object part data $D_h$ 702. In each histogram, a horizontal axis may indicate a plurality of object part IDs, and a vertical axis may indicate a probability value that input data may correspond to each of the plurality of object part IDs. For example, when an object is a human, a head, arms, a trunk, legs, and the like may be defined to be object parts of the human. In this instance, the classification tree learning apparatus may generate a histogram that represents a probability that an image representing a human may be recognized as a head in a predetermined node, a probability that the image may be recognized as an arm, a probability that the image may be recognized as a trunk, a probability that the image may be recognized as a leg, and the like, in each node of a classification tree.

In a root node 704 of the classification tree 703, all probabilities that input data may correspond to a class (namely, a part) of the root node 704 may be evenly computed and stored. However, as the classification tree learning apparatus continues to learn training data towards lower nodes of the classification tree, probabilities that input data may correspond to a class (namely, a part) of the root node 704 may be determined depending on classes. Accordingly, in a leaf node 705 of the classification tree 703, the input data may be determined to be a class (namely, a part) with a highest probability. In other words, as a level of the classification tree 703 increases during learning, a high probability of a predetermined class may be maintained, and probabilities of the other classes may be reduced.

In this instance, the classification tree learning apparatus may compute a difference value between a depth value of the visible object part data $D_v$ 701 and a depth value of the hidden object part data $D_h$ 702 in the leaf node 705, may compute a relative depth value, and may store the computed relative depth value together with each histogram in the leaf node 705.

Depending on example embodiments, the classification tree learning apparatus may repeatedly perform operations 801 and 802, and may generate a plurality of learned classification trees in operation 803. For example, the classification tree learning apparatus may repeat operations 801 and 802 K times, to learn a random forest including K classification trees.

Figure 9:
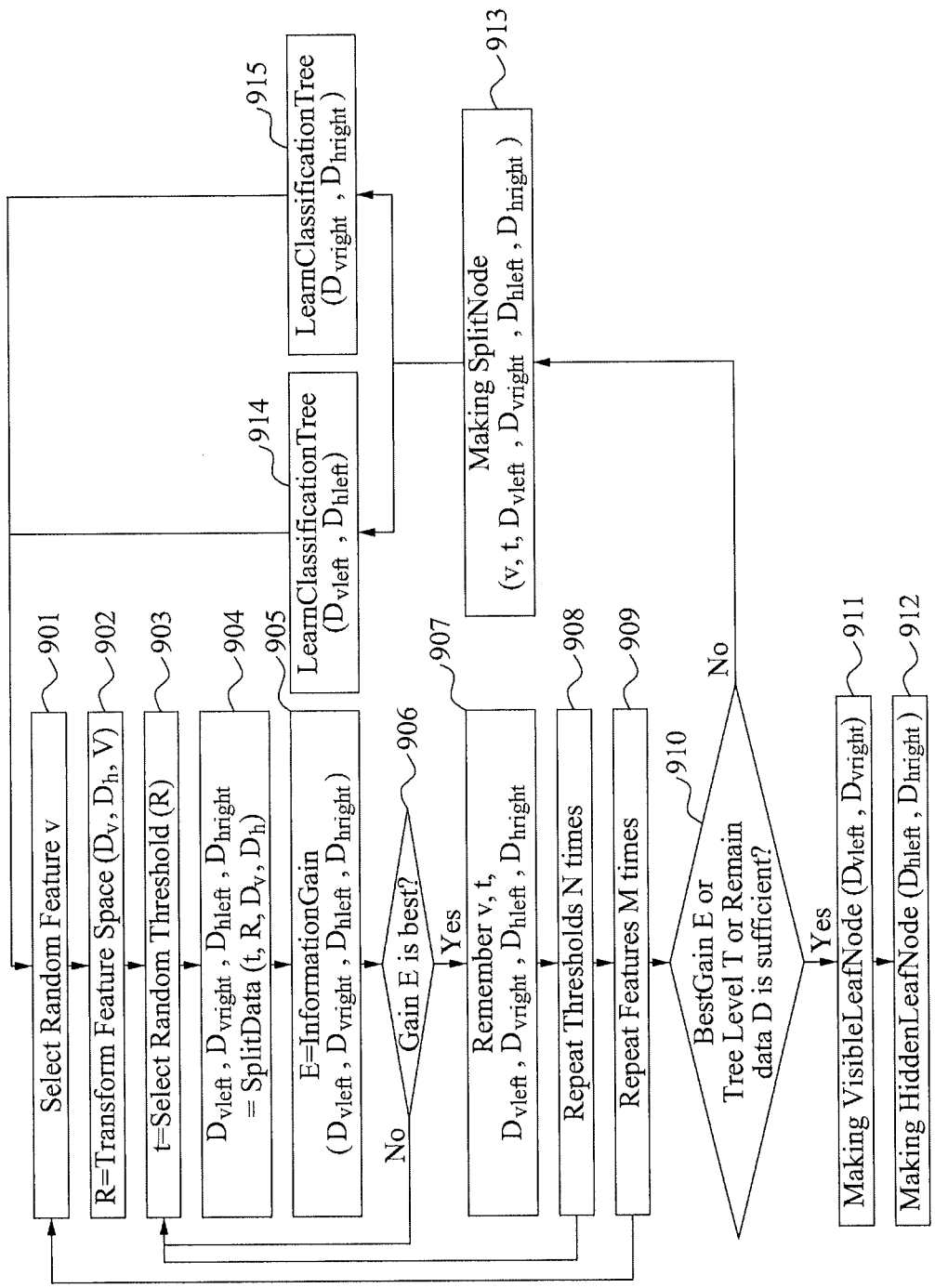
FIG. 9 illustrates a learning method, represented herein as being implemented by the example learning unit of FIG. 7B, for learning a classification tree.

FIG. 9 illustrates a learning method, represented herein as being implemented by the example learning unit of FIG. 7B, for learning a classification tree. Referring to FIG. 7B, to learn a classification tree, the learning unit 730 may include a feature selecting unit 741, a feature space transformation unit 742, a threshold selecting unit 743, a split unit 744, an information gain computing unit 745, and a classification tree generating unit 746.

Referring to FIG. 9, in operation 901, the feature selecting unit 741 may randomly select a single feature v from among a plurality of feature sets. In operation 902, the feature space transformation unit 742 may transform visible object part data $D_v$ and hidden object part data $D_h$ to a feature space, using the selected feature v. In this instance, the visible object part data $D_v$ and hidden object part data $D_h$ may represent data included in training data.

According to example embodiments, a feature may be a depth comparison feature, and the feature space transformation unit 742 may transform a feature space, using a depth comparison feature equation, for example, the below Equation 1-1.

$$f_{(u,v)}(I, x) = d_I\left(x + \frac{u}{d_I(x)}\right) - d_I\left(x + \frac{v}{d_I(x)}\right) \quad \text{Equation 1-1}$$

In Equation 1-1, $d_I(x)$ denotes a depth of a pixel x in an image I, and u and v denote offset points that are randomly selected from the pixel x. Additionally, $f_{(u,v)}(I,x)$ may be used as a split function of the split unit 744. Features other than the depth comparison feature may be selected, and the feature space transformation unit 742 may use a scheme for feature space transformation, for example a level set, a Histogram of Gradient (HoG), and the like, in addition to Equation 1-1. However, the above scheme is merely an example, and accordingly embodiments herein are not limited thereto.

In operation 903, the threshold selecting unit 743 may randomly select a threshold t from a range between a minimum value and a maximum value of the feature space. The below Equation 2-1 may represent an operation by which threshold selecting unit 743 selects the threshold t from the range between the minimum value and the maximum value of the feature space.

$$t \in (\min f(i), \max f(i)) \quad \text{Equation 2-1:}$$

In Equation 2-1, i denotes data included in $D_v$ and $D_h$. Additionally, $D_v$ or $D_h$ may be a pixel of an image, or a patch of an image, however, there is no limitation to a predetermined data form.

The split unit 744 may input, to a split function, a threshold, a feature space, and visible object part data, and may split visible object part data into two types that may be called 'left' data and 'right' data, for convenience of explanation of an example splitting of a node into two distinct lower nodes. Thus, in operation 904, the split unit 744 may split the visible object part data $D_v$ into left visible object part data $D_{vleft}$ and right visible object part data $D_{vright}$. Operation 904 of splitting the visible object part data $D_v$ into the left visible object part data $D_{vleft}$ and the right visible object part data $D_{vright}$ may correspond to splitting a current node into lower nodes in a classification tree. Accordingly, whether predetermined data is to be classified as 'right' data or 'left' data may be optionally selected.

The split unit 744 may split visible object part data, using a split function represented by the below Equation 2-2.

$$D_{vleft} = \{i \in D_v | f(i) < t\}$$

$$D_{vright} = D_v \backslash D_{vleft} \quad \text{Equation 2-2:}$$

In Equation 2-2, i denotes data included in $D_v$. Additionally, $D_{vleft}$ denotes left visible object part data, and $D_{vright}$ denotes right visible object part data, again noting that the 'left' and 'right' designations here are only for convenience of explanation. When a result value obtained by inputting the data i to a split function f(x) is less than the threshold t, the split unit 744 may classify the data i as left visible object part data. Conversely, when the result value is equal to or greater than the threshold t, the split unit 744 may classify the data i as right visible object part data.

Similarly, the split unit 744 may split hidden object part data, using a split function represented by the below Equation 2-3.

$$D_{hleft} = \{i \in D_h | f(i) < t\}$$

$$D_{hright} = D_h \backslash D_{hleft} \quad \text{Equation 2-3:}$$

In Equation 2-3, $D_{hleft}$ denotes left hidden object part data, $D_{hright}$ denotes right hidden object part data, and $D_h$ denotes hidden object part data.

In operation 905, the information gain computing unit 745 may compute an information gain for each of the left visible object part data $D_{vleft}$, the right visible object part data $D_{vright}$, left hidden object part data $D_{hleft}$, and right hidden object part data $D_{hright}$. For example, the information gain computing unit 745 may compute a first intermediate information gain for the left visible object part data $D_{vleft}$ and the right visible object part data $D_{vright}$. Additionally, the information gain computing unit 745 may compute a second intermediate information gain for the left hidden object part data $D_{hleft}$ and the right hidden object part data $D_{vright}$. When the first intermediate information gain and the second intermediate information gain are computed, the information gain computing unit 745 may compute a final information gain, based on the computed first intermediate information gain and the computed second intermediate information gain.

For example, to compute the first intermediate information gain and the second intermediate information gain, the information gain computing unit 745 may use Equation 2-4 shown below based on a Shannon entropy E(D) in each node.

$$E(D) = -\sum_{i=1}^{c} P(c_i | D) \log P(c_i | D) \quad \text{Equation 2-4}$$

In Equation 2-4, E(D) denotes the Shannon entropy, c denotes a number of classes, $c_i$ denotes an i-th object part class, and D denotes a data set in a predetermined node. Additionally, $P(c_i|D)$ denotes a probability of the i-th object part class $c_i$ in the data set D. In this instance, the probability may represent a ratio of a number of i-th object part classes $c_i$ to a number of data sets D. For example, when a total number of data sets is "100," and when 15 voxels represent a third object part class, for example a hand, $P(c_3|D)$ may have a value of "0.15."

Depending on example embodiments, the information gain computing unit 745 may determine whether a discriminative class set is found, using the Gini entropy, the Shannon entropy, and the like.

The information gain computing unit 745 may compute a discriminative magnitude $\Delta E_v$ of visible object part data of each node, as shown in the below Equation 2-5.

$$\Delta E_v = \frac{|D_{vleft}|}{|D_v|} E(D_{vleft}) + \frac{|D_{vright}|}{|D_v|} E(D_{vright}) \quad \text{Equation 2-5}$$

Additionally, the information gain computing unit 745 may compute a discriminative magnitude $\Delta E_{hn}$ of n-th hidden object part data of each node, as shown in the below Equation 2-6.

$$\Delta E_{hn} = \frac{|D_{hleft}|}{|D_h|} E(D_{hleft}) + \frac{|D_{hright}|}{|D_h|} E(D_{hright}) \quad \text{Equation 2-6}$$

Based on values obtained by using Equations 2-4 through 2-6, the information gain computing unit 745 may compute a final information gain, as shown in the below Equation 2-7.

$$\Delta E = \alpha \times \Delta E_v + (1-\alpha) \times \Delta E_h \quad \text{Equation 2-7:}$$

In this instance, by adjusting a value of a between 0 and 1, the information gain computing unit 745 may determine which one of visible object part data and hidden object part data is most likely, based upon the weighting of α, and may determine whether an information gain is to be computed. For example, when only an information gain of visible object part data is desired to be considered, the information gain computing unit 745 may set the value of a to "1." Additionally, as the value of α becomes close to "1," the information gain computing unit 745 may determine whether visible object part data is discriminatively configured. As the value of a becomes close to "0," the information gain computing unit 745 may determine whether hidden object part data is discriminatively configured. When the value of α is set to "0.5," the information gain computing unit 745 may determine that the visible object part data and the hidden object part data have equal weighting.

In operation 906, the classification tree generating unit 746 may determine whether the computed information gain has a value within an optimum reference range, which may be predetermined. When the information gain is beyond the optimum reference range, the classification tree generating unit 746 may randomly reselect a threshold. Additionally, operations 904 through 906 may be repeatedly performed using the reselected threshold. When the information gain is within the optimum reference range, the classification tree generating unit 746 may store, in a current node of a classification tree, a value of the selected feature v, the threshold t, the left visible object part data $D_{vleft}$, the right visible object part data $D_{vright}$, the left hidden object part data $D_{hleft}$, and the right hidden object part data $D_{hright}$ in operation 907.

In operation 908, the classification tree generating unit 746 may reselect a threshold, and may iterate N times operations 903 through 907. In operation 909, the classification tree generating unit 746 may reselect a feature, and may iterate M times operations 901 through 908. To acquire a feature and a threshold corresponding to a smallest discriminative magnitude $\Delta E_v$, 'N×M' tests may be performed by iterating N times operations 903 through 907, and by iterating M times operations 901 through 908. The smallest discriminative magnitude $\Delta E_v$ may be a best gain E, that is, a final information gain computed to have an optimum value through iteration.

In operation 910, the classification tree generating unit 746 may determine whether the current node satisfies stopping criteria. For example, when at least one of the below conditions i) to iii) is satisfied, the classification tree generating unit 746 may determine that the current node satisfies a stopping criteria.

i) A case in which a final information gain (namely, best gain E) is equal to or less than a reference value, such as ΔE<0.5, as an example.

ii) A case in which a level of a classification tree is equal to or greater than a reference value, such as when the current level of the classification tree is equal to or greater than "25", as an example.

iii) A case in which an amount of visible object part data and hidden object part data is equal to or less than a reference value, such as when a number of voxels included in data is equal to or less than "10", as an example.

When the current node is determined to satisfy the stopping criteria, the classification tree generating unit 746 may determine the current node to be a leaf node, and may terminate learning of a corresponding data set. When a hidden object part overlaps several times behind a visible object part, the classification tree generating unit 746 may generate a plurality of histograms for the hidden object part for a single leaf node. For example, when a plurality of parts overlap, a same number of hidden object parts as a number of overlapping parts may exist, and the classification tree generating unit 746 may generate a plurality of histograms for the hidden object parts in a single leaf node, and may store information on each of the hidden object parts. Similarly, again with reference to FIG. 5, in such an example, histograms may be generated for each of the illustrated muscular, skeletal, internal organ, cardiovascular system, nervous system, etc., hidden levels.

The classification tree generating unit 746 may generate, in each node, a first histogram of a visible object part, and a second histogram of a hidden object part. In this instance, the first histogram may represent a probability that each of a plurality of object parts of an object to be analyzed may be determined to be a visible object part. Additionally, the second histogram may represent a probability that each of the plurality of object parts of the object may be determined to be a hidden object part. In operations 911 and 912, the classification tree generating unit 746 may store the first histogram and the second histogram in the current node of the classification tree.

In this instance, the probability of the first histogram may have the same meaning as the probability $P(c_i|D)$ for a visible object part in Equation 2-4. Additionally, the probability of the second histogram may have the same meaning as the probability $P(c_i|D)$ for a hidden object part in Equation 2-4.

For example, a ratio of each class $c_i$ belonging to a visible object part to data D remaining in a leaf node during learning may be calculated as a probability, and may be stored in the first histogram. Additionally, a ratio of each class $c_i$ belonging to a hidden object part to the data D may be calculated as a probability, and may be stored in the second histogram.

When the current node is determined to be a leaf node, the classification tree generating unit 746 may compute a relative depth value, and may store the computed relative depth value. The relative depth value may indicate a difference value between a depth value of a visible object part and a depth value of a hidden object part, noting that there may be plural relative depth values with respect to the depth of the visible object part depending on which hidden layer is being referenced. Accordingly, when an object recognition apparatus recognizes the object using a classification tree generated and learned by a classification tree learning apparatus, each part of the object may be recognized, and a volume of the object may be reconstructed, by using the relative depth value, and the first histogram and the second histogram that are stored corresponding to the leaf node.

Briefly, FIG. 14B illustrates an object recognition method, represented herein as being implemented by an example object recognition system, determining a leaf node, according to example embodiments. For example, FIG. 14B illustrates an operation by which the classification tree generating unit 746 determines a leaf node, in association with visible object part data and hidden object part data.

Referring to FIG. 14B, the classification tree generating unit 746 may perform primary splitting 1401 on a visible layer 1410 included in visible object part data, using the feature and the threshold that are initially selected, and using the split function. Additionally, the classification tree generating unit 746 may reselect a feature and a threshold, and may perform secondary splitting 1402, tertiary splitting 1403, and the like, until the stopping criteria is satisfied. When the current node satisfies the stopping criteria through iterative splitting, the classification tree generating unit 746 may determine a corresponding object part 1404 to be a leaf node. Similarly, the classification tree generating unit 746 may iterate splitting on a first hidden layer 1420 through an n-th hidden layer 1430, and may determine a leaf node.

When the current node fails to satisfy the stopping criteria, the classification tree generating unit 746 may determine the current node to a split node in operation 913. The classification tree generating unit 746 may store, in the current node determined to be the split node, a value of the selected feature v, the threshold t, the left visible object part data $D_{vleft}$, the right visible object part data $D_{vright}$, the left hidden object part data $D_{hleft}$, and the right hidden object part data $D_{hright}$.

Additionally, the classification tree generating unit 746 may learn a left child node, by using, as inputs, the left visible object part data $D_{vleft}$ and left hidden object part data $D_{hleft}$ in operation 914, and may learn a right child node, by using, as inputs, the right visible object part data $D_{vright}$ and right hidden object part data $D_{hright}$ in operation 915. For example, when the current node fails to satisfy the stopping criteria, the classification tree generating unit 746 may recursively call the classification tree, using the left visible object part data $D_{vleft}$ and left hidden object part data $D_{hleft}$ as input data, and may recursively call the classification tree, using the right visible object part data $D_{vright}$ and right hidden object part data $D_{hright}$ as input data. In this instance, operations 901 through 910 may equally be applied to an operation of learning a lower node.

The operation by which the classification tree learning apparatus learns the classification tree has been described above with reference to FIGS. 7A through 9. Hereinafter, an operation by which an object recognition apparatus recognizes an object part from a depth image representing an object to be analyzed, using the learned classification tree will be described.

Figure 10A:
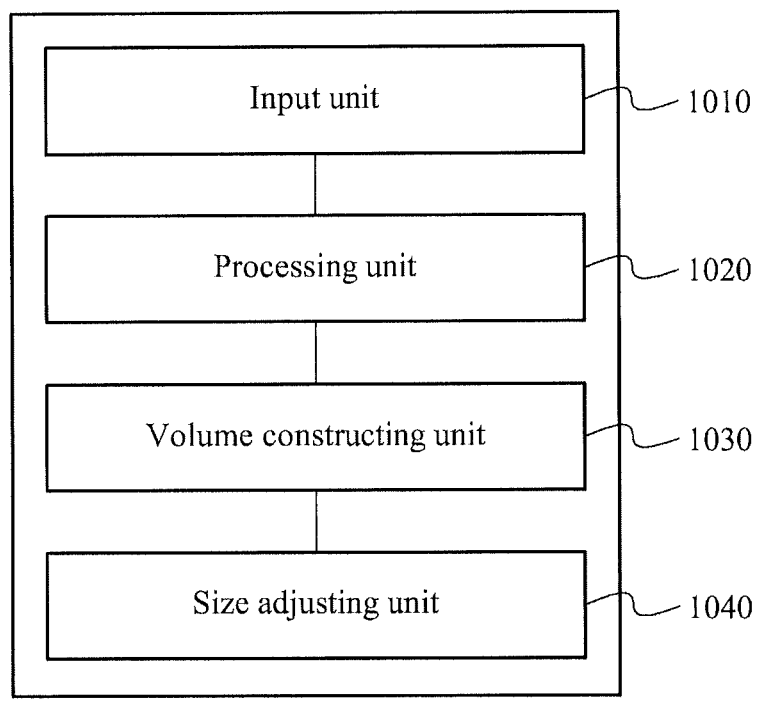
FIG. 10A illustrates a block diagram of a configuration of an object recognition apparatus, according to example embodiments.
Figure 11:
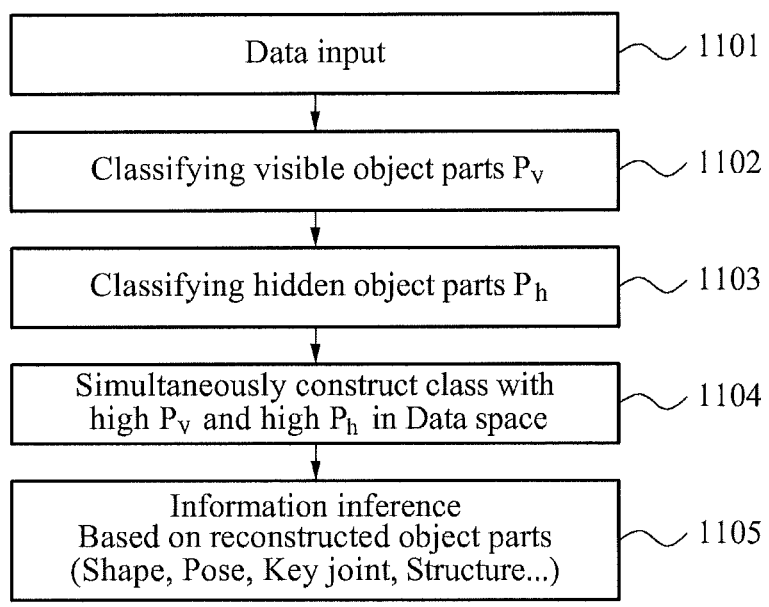
FIG. 11 illustrates an object recognition method, represented herein as being implemented by the example object recognition apparatus of FIG. 10A.

FIG. 10A illustrates a block diagram of a configuration of an object recognition apparatus, according to example embodiments, and FIG. 11 illustrates an object recognition method, represented herein as being implemented by the example object recognition apparatus of FIG. 10A. Referring to FIG. 10A, the object recognition apparatus may include an input unit 1010, and a processing unit 1020. As noted above, depending on embodiment, an example object recognition system may include an object recognition apparatus and a classification tree learning apparatus, with examples of both being described herein. In operation 1101 of FIG. 11, the input unit 1010 may receive, as an input, a depth image representing an object to be analyzed. The object may include, for example, a human body, an inanimate object, and the like, as described above.

In operations 1102 and 1103, the processing unit 1020 may recognize visible object parts and hidden object parts of the object from the depth image, using the learned classification tree.

Figure 10B:
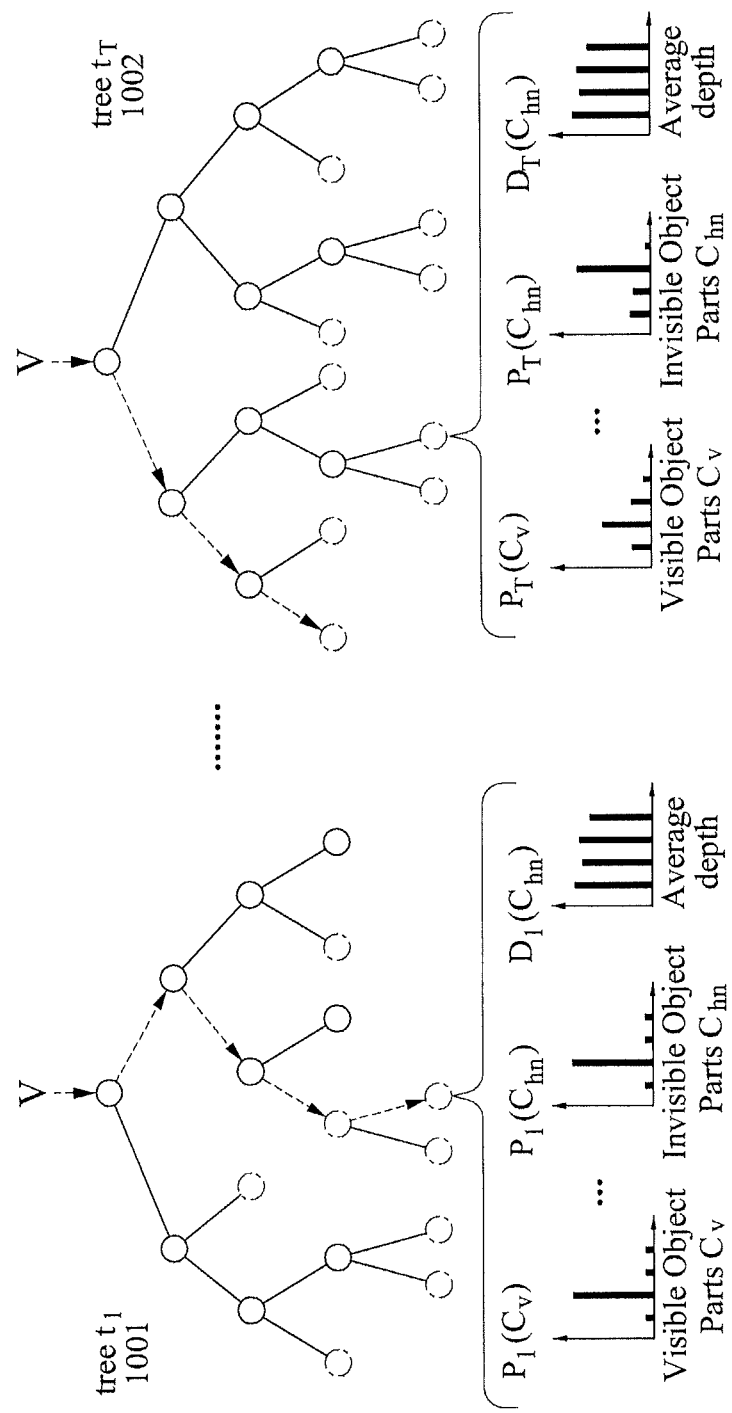
FIG. 10B illustrates an object recognition method, represented herein as being implemented by the example recognition apparatus of FIG. 10A, for recognizing on an input image using a plurality of learned classification trees.

FIG. 10B illustrates an object recognition method, represented herein as being implemented by the example recognition apparatus of FIG. 10A, for recognizing on an input image using a plurality of learned classification trees. Referring to FIG. 10B, when a plurality of classification trees, for example classification trees 1001 and 1002, and the like, have been learned, the processing unit 1020 may input the depth image to each of the plurality of learned classification trees, and may recognize which one of visible object parts and hidden object parts corresponds to the depth image. For example, the processing unit 1020 may determine whether processing is to be performed toward a left node, or processing is to be performed toward a right node, by using a feature v and a threshold t, and may finally reach a leaf node of the classification tree. In this instance, the feature v may be stored through learning in a split node of each level of the classification tree. By using a class probability histogram for visible object parts, and a class probability histogram(s) for hidden object parts, the object recognition apparatus may recognize which one of visible object parts and hidden object parts corresponds to the depth image. The class probability histograms may be stored through learning in the leaf node, such as described above with regard to FIGS. 7A-9. For example, the processing unit 1020 may recognize visible object parts and hidden object parts, based on an average of results acquired from a leaf node of each of the plurality of learned classification trees.

The object recognition apparatus of FIG. 10A may further include a volume constructing unit 1030. The volume constructing unit 1030 may construct a volume of the object in a single data space, using the recognized visible object parts and recognized hidden object parts in operation 1104. The volume constructing unit 1030 may construct the volume, using a relative depth value stored in a leaf node of the learned classification tree. Since the relative depth value refers to a difference value between a depth value of a recognized visible object part and a depth value of a recognized hidden object part, the volume constructing unit 1030 may compute the depth value of the hidden object part, by adding or subtracting the relative depth value to or from the input depth value, and may construct the volume of the object based on the computed depth value.

Depending on example embodiments, additional information regarding the object may be extracted based on the constructed volume in operation 1105. For example, the processing unit 1020 may extract the additional information. The additional information may include, for example, information regarding at least one of a shape, a pose, a key joint, and a structure that are associated with the object.

The object recognition apparatus of FIG. 10A may further include a size adjusting unit 1040. The size adjusting unit 1040 will be further described below.

Figure 12:
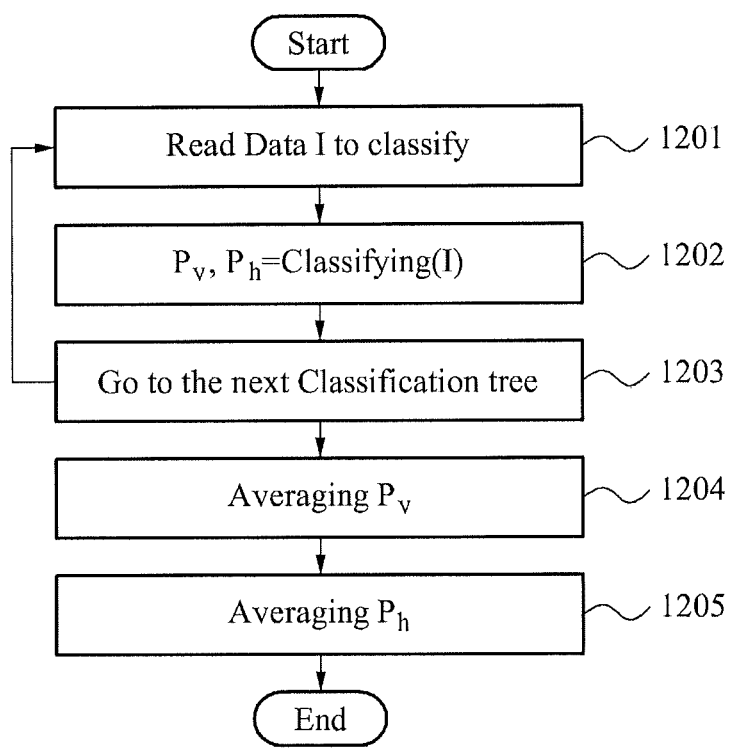
FIG. 12 illustrates an object recognition method, represented herein as being implemented by an example object recognition apparatus, for recognizing an object using a plurality of learned classification trees, according to example embodiments.

FIG. 12 illustrates an object recognition method, represented herein as being implemented by an example object recognition apparatus, for recognizing an object using a plurality of learned classification trees, according to example embodiments. Referring to FIG. 12, the object recognition apparatus may receive, as an input, a depth image representing an object to be analyzed in operation 1201, and may recognize visible object parts and hidden object parts using one of a plurality of learned classification trees in operation 1202. When the recognizing of the visible object parts and hidden object parts using a single learned classification tree is completed, the object recognition apparatus may iterate operations 1201 and 1202, using another learned classification tree. By iterating the recognizing using the plurality of learned classification trees, the object recognition apparatus may acquire a probability value $P_v$ of visible object parts, and a probability value $P_h$ of hidden object parts, for each of the plurality of learned classification trees. Additionally, the object recognition apparatus may acquire a depth value D of each of hidden object parts, for each of the plurality of learned classification trees.

In operations 1204 and 1205, the object recognition apparatus may compute an average of the probability value $P_v$ and the probability value $P_h$, and an average of depth values of hidden object part data. For example, when input data is assumed to be 'I,' and when 'T' learned classification trees are provided, the object recognition apparatus may compute a probability P that a visible object part may belong to a predetermined class $c_v$, as shown in the below Equation 3-1.

$$P(c_v \mid I) = \frac{1}{T}\sum_{t=1}^{T} P_t(c_v \mid I) \qquad \text{Equation 3-1}$$

The object recognition apparatus may select, as a type of a visible object part, a class with a highest probability value among classes $c_v$ obtained by Equation 3-1. For example, when a hand has a highest probability value among respective classes for a head, an arm, the hand, a trunk, a leg and a foot, the object recognition apparatus may select the hand as a type of a visible object part.

Similarly, the object recognition apparatus may compute a probability P that a hidden object part may belong to a predetermined class $c_{hn}$, as shown in Equation 3-2 below. When a hidden object part overlaps several times behind a visible object part, a plurality of classes $c_h$, for example 'n' classes $c_h$, may exist.

$$P(c_{hn} \mid I) = \frac{1}{T}\sum_{t=1}^{T} P_t(c_{hn} \mid I) \qquad \text{Equation 3-2}$$

The object recognition apparatus may select, as a type of each of 'n' overlapping hidden object parts, a class with a highest probability value among classes $c_h$ obtained by Equation 3-2. In an example, when a leg has a highest probability value among a head, an arm, a hand, a trunk, the leg and a foot in a first hidden layer, the object recognition apparatus may select the leg as a type of a first hidden object part. In another example, when a foot has a highest probability value among a head, an arm, a hand, a trunk, a leg and the foot in a second hidden layer, the object recognition apparatus may select the foot as a type of a second hidden object part.

Figure 13:
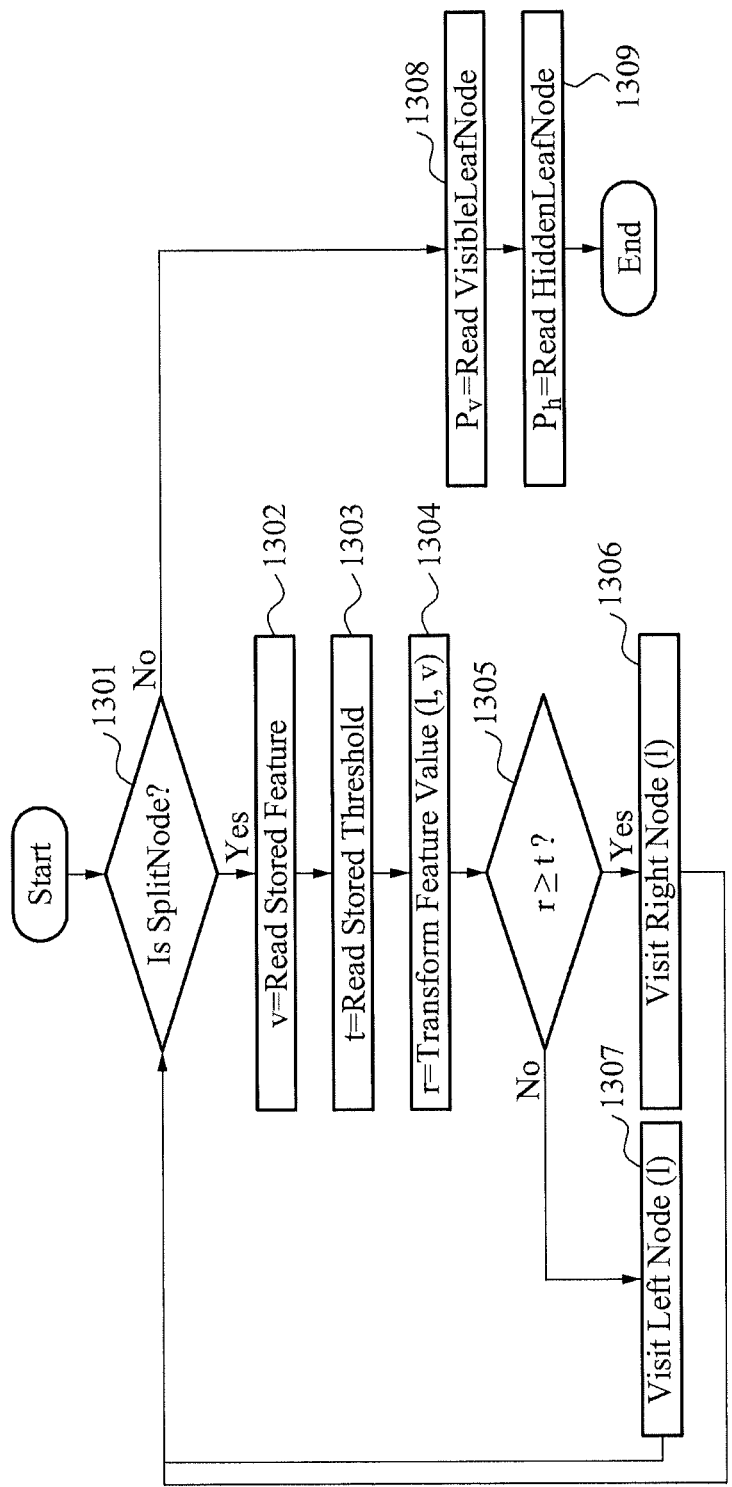
FIG. 13 illustrates an object recognition method, represented herein as being implemented by an example object recognition apparatus, for recognizing an object to be analyzed, using information stored in a learned classification tree, according to example embodiments.

FIG. 13 illustrates an object recognition method, represented herein as being implemented by an example object recognition apparatus, for recognizing an object to be analyzed, using information stored in a learned classification tree, according to example embodiments. FIG. 13 will be explained with reference to the object recognition apparatus of FIG. 10A. Referring to FIG. 13, the processing unit 1020 of FIG. 10A may input a depth image to a learned classification tree. In operation 1301, the processing unit 1020 may determine whether a current node of the learned classification tree is a split node. When the current node is determined to be the split node, the processing unit 1020 may read a value of a feature v stored in the split node in operation 1302. In operation 1303, the processing unit 1020 may read a threshold t stored in the split node. In operation 1304, the processing unit 1020 may compute a result value r, by inputting the read value of the feature v and the read threshold t to a split function. The split function may be stored in the split node of the learned classification tree.

The processing unit 1020 may search for one of a left child node and a right child node of the current node in the learned classification tree, based on the computed result value r. In operation 1305, the processing unit 1020 may compare the result value r with the threshold t. When the result value r is less than the threshold t, the processing unit 1020 may search for the left child node in operation 1307. When the result value r is equal to or greater than the threshold t, the processing unit 1020 may search for the right child node in operation 1306. In this instance, to search for one of the left child node and right child node, the same class as a class used during generation of a classification tree, for example Equation 2-2 or Equation 2-3, may be used. When another class is used during the generation of the classification tree, the left child node or the right child node may be changed. When the left child node or the right child node is found, the processing unit 1020 may determine whether the found node is a split node in operation 1301. When the found node is determined to be the split node, the processing unit 1020 may iterate operations 1302 through 1307.

When the current node is determined to be a leaf node, not the split node, the processing unit 1020 may read a first histogram for visible object parts stored in the leaf node in operation 1308. In operation 1309, the processing unit 1020 may read a second histogram for hidden object parts. The processing unit 1020 may recognize visible object parts from the depth image based on the read first histogram, and may recognize hidden object parts from the depth image based on the read second histogram. In other words, the processing unit 1020 may recognize which one of visible object parts and hidden object parts correspond to the input depth image.

When information on an object size of a depth image is used during recognition of the object, a performance of recognition of visible object parts and hidden object parts may be enhanced. Accordingly, the object recognition apparatus may further include the size adjusting unit 1040 to verify a size of an input object and to control a recognition method in the object recognition apparatus. The size adjusting unit 1040 may be located in the processing unit 1020.

Figure 14A:
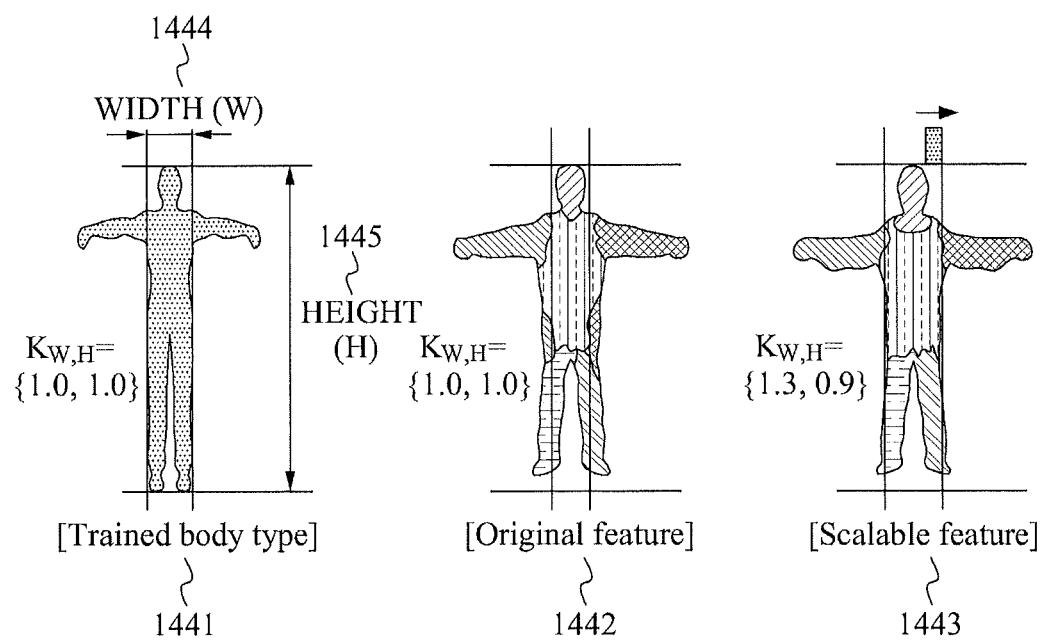
FIG. 14A illustrates an object recognition method, represented herein as being implemented by an example object recognition apparatus, for enhancing object recognition performance based on a difference between a size of an input object and a three-dimensional (3D) object model used during learning, according to example embodiments.

FIG. 14A illustrates an object recognition method, represented herein as being implemented by an example object recognition apparatus, for enhancing object recognition performance based on a difference between a size of an input object and a three-dimensional (3D) object model used during learning, according to example embodiments. Referring to FIG. 14A, a trained body type 1441 used in the classification tree learning apparatus may be different from a body type of an object of a depth image that is actually input. As a result, when the object recognition apparatus recognizes a visible object part and a hidden object part, an error of recognizing a waist as a hand may occur, like a result obtained by applying an original feature 1442 that is not changed. To correct the above error, the size adjusting unit 1040 may reflect a width 1444 and a height 1445 of the input object on feature space transformation in operation 1304 of FIG. 13.

The size adjusting unit 1040 may use a feature space transformation equation, for example the below Equation 3-3, in operation 1304.

$$f_{(u,v)}(I, x, K^*_{W,H}) = d_I\left(x + \frac{K^*_{W,H} \odot u}{d_I(x)}\right) - d_I\left(x + \frac{K^*_{W,H} \odot v}{d_I(x)}\right).$$ Equation 3-3

In Equation 3-3, $d_I(x)$ denotes a depth of a pixel x in an image I, and u and v denote offset points that are randomly selected from the pixel x. Additionally, an operator $\odot$ denotes an element-wise multiplication in two-dimensions (2D).

The size adjusting unit 1040 may compute an optimum coefficient $K^*_{W,H}$ of an object type having a width W and a height H used in Equation 3-3 (for example, a body type), as shown in the below Equation 3-4.

$$K^*_{W,H} = \underset{K_{W,H}}{\mathrm{argmax}} \frac{1}{T}\sum_{t=1}^{T}\sum_{b} P(c \mid K_{W,H}, b)$$ Equation 3-4

In Equation 3-4, $K_{W,H}=(W, H)$ denotes a set of coefficient parameters used to adjust a feature scale corresponding to the width W and height H of the object type. Additionally, T denotes a number of classification trees, and c denotes an object part probability of each classification tree for a given object part ID b.

Since a result of recognition of visible object parts and hidden object parts may include a distribution of a plurality of object parts having the same class ID, a joint position X* of an object skeleton (for example, a human skeleton) may be predicted by a Bayesian method as shown in Equation 3-5 below, and thus accuracy may be further enhanced.

$$X^* = \underset{X}{\mathrm{argmax}}\, P(S \mid X)P(c \mid X)P(L \mid X)$$ Equation 3-5

In Equation 3-5, X denotes a joint position of a given object probability c, S denotes a silhouette matching accuracy, and L denotes an object part continuity. A candidate joint X* with a highest probability may be selected from among all candidate joints, and may be used to represent a skeleton of an object.

Depending on the example above-described embodiments, an example object recognition system, example object recognition apparatus, and example classification tree learning apparatus may respectively be implemented by at least one processing device, such as a computer. In an addition, an example object recognition method and example classification tree learning method, according to the example above-described embodiments, may be implemented by computer readable code recorded in non-transitory computer-readable media, such as program instructions to implement various operations embodied by such a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A computer-implemented object recognition system, comprising:
    an input unit configured to receive a depth image representing an object;
    a processor configured to use a classification tree to recognize, from the depth image of the object, a visible object part and a hidden object part; and
    a volume constructing unit configured to construct a volume of the object in a single data space, based on the recognized visible object part and the recognized hidden object part;
    wherein the volume constructing unit is configured to construct the volume, based on a relative depth value stored in a leaf node of the classification tree.

2. The computer-implemented object recognition system of claim 1, wherein the processor is configured to extract additional information regarding the object, based on the volume.

3. The computer-implemented object recognition system of claim 2, wherein the additional information comprises information regarding at least one of: a shape, a pose, a key joint, and a structure associated with the object.

4. The computer-implemented object recognition system of claim 1, wherein the relative depth value indicates a difference value between a depth value of the recognized visible object part and a depth value of the recognized hidden object part.

5. The computer-implemented object recognition system of claim 1, further comprising:
    a size adjusting unit configured to adjust at least one size of a width and a height of an object model of the object.

6. The computer-implemented object recognition system of claim 1, wherein the classification tree comprises a probability value of the visible object part, and a probability value of the hidden object part.

7. The computer-implemented object recognition system of claim 1, wherein the classification tree comprises a relative depth value associated with the visible object part and the hidden object part.

8. The computer-implemented object recognition system of claim 1, wherein the classification tree is represented by using at least a portion of the hidden object part as a plurality of layers.

9. The computer-implemented object recognition system of claim 1, wherein the processor is configured to recognize the visible object part and the hidden object part based upon a single depth image.

10. A computer-implemented object recognition system, comprising:
    an input unit configured to receive a depth image representing an object; and
    a processor configured to use a classification tree to recognize, from the depth image of the object, a visible object part and a hidden object part;
    wherein the processor is configured to apply the depth image to the classification tree,
    wherein, when a current node of the classification tree is a split node, the processor is configured to read a value of a feature and a threshold from the split node, apply the value of the feature and the threshold to a split function, and search for one of a left child node and a right child node of the current node based on a result of the split function, and
    wherein, when the current node is a leaf node, the processor is configured to read, from the leaf node, a first histogram of the visible object part and a second histogram of the hidden object part, recognize the visible object part from the depth image, based on the read first histogram, and recognize the hidden object part from the depth image, based on the read second histogram.

11. The computer-implemented object recognition system of claim 10, wherein, when a result value of the split function does not meet the threshold, the processor is configured to search for the left child node, and
    wherein, when the result value meets the threshold, the processor is configured to search for the right child node.

12. The computer-implemented object recognition system of claim 11, wherein the classification tree is represented using at least a portion of the hidden object part as a plurality of layers, with the processor configured to read a plurality of hidden object histograms from the leaf node, and recognize at least one hidden object part from the depth image based on the read plurality of hidden object histograms.

13. The computer-implemented object recognition system of claim 12, wherein the plurality of hidden object histograms include at least one of: a hidden object histogram representing muscles of a human body, a hidden object histogram representing a skeletal structure of the human body, a hidden object histogram representing internal organs of the human body, a hidden object histogram representing a cardiovascular system of the human body, and a hidden object histogram representing a nervous system for the human body.

14. A computer implemented object recognition method, comprising:
    receiving, as an input, a depth image representing an object to be analyzed;
    recognizing a visible object part and a hidden object part of the object, from the depth image of the object, by using a processor and a classification tree; and
    constructing a volume of the object in a single data space, based on the recognized visible object part and the recognized hidden object part, and based on a relative depth value stored in a leaf node of the classification tree, by using the processor.

15. A non-transitory computer readable recording medium comprising computer readable code to control at least the processor to implement the method of claim 14.

16. A computer-implemented object recognition system, comprising:
- an input unit configured to receive a depth image representing an object; and
- a processor configured to use a classification tree to recognize, from the depth image of the object, a visible object part and a hidden object part;
- a classification tree obtaining unit configured to obtain the classification tree, wherein the classification tree is learned based upon consideration of modeled visible and hidden object parts for each of plurality of nodes of the classification tree.

17. The computer-implemented object recognition system of claim 16, wherein the classification tree obtaining unit configured to generate the classification tree through learning based upon consideration of visible and hidden object parts, for each of a plurality of nodes, and obtain the generated classification tree to be available to the processor for the recognizing of the visible object part and the hidden object part.

18. The computer-implemented object recognition system of claim 17, further comprising:
- a casting unit configured to cast rays towards a plurality of voxels of a three-dimensional (3D) object model of the object, by using a virtual camera;
- an image layer generating unit configured to generate a plurality of image layers sequentially every time the rays penetrate a surface of the 3D object model;
- a capturing unit configured to capture a depth value and a voxel identifier (ID) of the surface, for each of the plurality of image layers, and to store the captured depth value and the captured voxel ID in each of the plurality of image layers; and
- a training data generating unit configured to set an image layer with a minimum distance from the virtual camera to be visible object part data associated with the visible object part, to set the other image layers to be hidden object part data associated with the hidden object part, and to generate the training data.

19. A computer-implemented object recognition method, comprising:
- obtaining a classification tree by using a processor, wherein the classification tree is learned based upon consideration of modeled visible object parts and hidden object parts, for each of the plurality of nodes of the classification tree; and
- recognizing, by using a processor and the classification tree, a visible object part and a hidden object part of an object, based on a depth image of the object.

20. The computer-implemented object recognition method of claim 19, further comprising:
- generating the classification tree, through learning based upon consideration of visible object parts and hidden object parts for each of the plurality of nodes of the classification tree.

* * * * *